United States Patent [19]

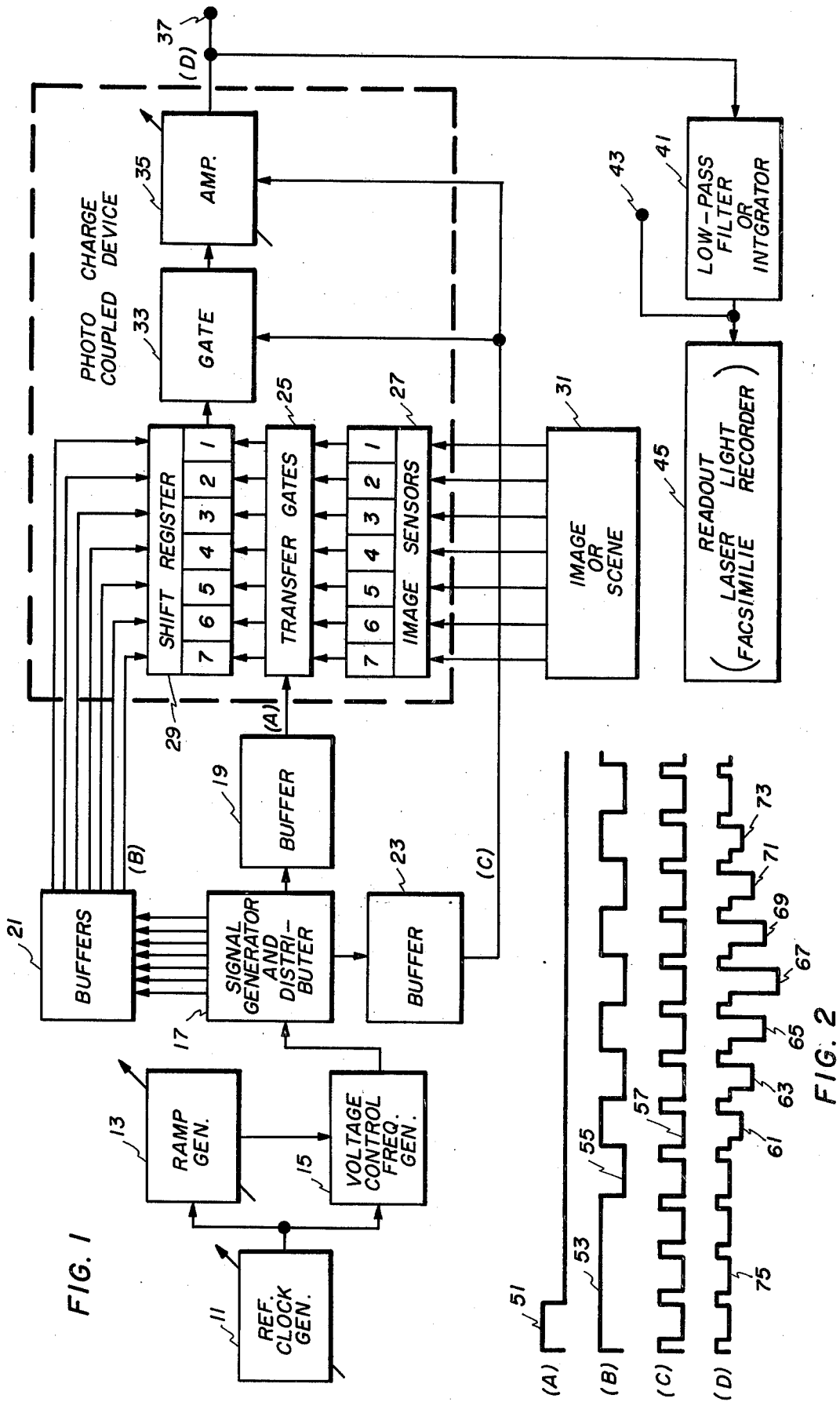

McKechnie

[11] 4,153,915
[45] May 8, 1979

[54] OPTICAL IMAGE MODIFIER FOR DISTORTION OR OTHER COMPENSATION

[75] Inventor: John C. McKechnie, Maitland, Fla.

[73] Assignee: The United States of America as represented by the Secretary of the Navy, Washington, D.C.

[21] Appl. No.: 883,569

[22] Filed: Mar. 6, 1978

[51] Int. Cl.² .................. H04N 3/14; H04N 5/21; H04N 5/66
[52] U.S. Cl. .................................. 358/213; 358/166
[58] Field of Search ...................... 358/212, 213, 166

[56] References Cited

U.S. PATENT DOCUMENTS 4,013,832  3/1977  Douglas ........................... 358/212

Primary Examiner—Robert L. Richardson
Attorney, Agent, or Firm—Richard S. Sciascia; Don D. Doty

[57] ABSTRACT

An optical image modifier is disclosed as comprising an adjustable reference clock signal generator which timely enables a sawtooth signal producing adjustable ramp generator and a voltage controlled frequency generator controlled thereby for producing a programmed frequency modulated signal which is, in turn, supplied to a preprogrammed signal generator and distributor. In response to said programmed frequency modulated signal, said generator-distributor produces and distributes a plurality of control signals to a charge coupled device — containing, in this particular instance, image sensors, transfer gates, one or more shift registers, a control gate, and an enabling amplifier — for the purpose of controlling the modification of any optical images (or other signals) sensed, transduced, stored, and read out thereby in accordance with a predetermined program that was effectively preset by the appropriate adjustments of the aforesaid reference clock and ramp generators. A low-pass filter or integrator may optionally be employed to smooth the output signal from said charge coupled device prior to its being displayed or recorded by any suitable readout.

31 Claims, 2 Drawing Figures

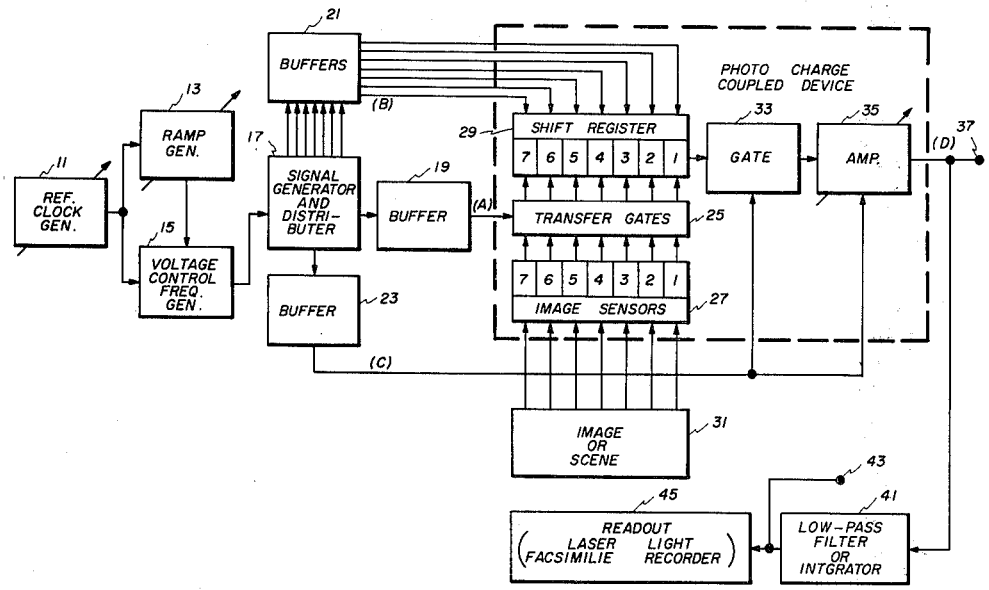

OPTICAL IMAGE MODIFIER FOR DISTORTION OR OTHER COMPENSATION

FIELD OF THE INVENTION

In general, the subject invention relates to data processing systems and, in particular, pertains to an improved linear-to-linear, nonlinear-to-nonlinear, linear-to-nonlinear, and nonlinear-to-linear data processing system, the input and output functions and parameters of which are determined by the adjustment thereof and the input and output transducers combined therewith, respectively.

In even greater particularity, the invention consists of an improved optical sensing and display system that incorporates a unique method and means for timely scanning a plurality of optical image sensors — such as, for example, a plurality of charge coupled devices (CCDs) — that are observing a distorted optical image and for converting the scan thereof into a more or less true, predetermined, distortion compensated image, thereby changing the fidelity thereof, as desired.

DESCRIPTION OF THE PRIOR ART

Heretofore, in many instances, spatial distortions were eliminated from visual displays by means of compensating glass lenses or the making of changes in image planes.

In addition, image alteration has been effected by the Solid State Image Modulator device of U.S. Pat. No. 4,013,832 to Graham M. Douglas, which pertains to apparatus for modulating an optical image formed on a photosensor portion of a one or two dimensional charge-coupled photodiode array with a predetermined pattern of density variations, so as to cause the pattern thereof to move in a certain manner with respect to said optical image. As disclosed therein, a linear charge-coupled diode array, consisting of a photosensor array for accumulating a plurality of photocharges, is associated with a charge-coupled shift register having one charge-coupled stage for each photosensor element. The shift register is actuated by clock pulses in such manner as to move "packets" of accumulated charges to the output thereof. At predetermined intervals, a transfer signal is applied to the photosensor array, causing the charges accumulated by the photosensitive elements thereof to be transferred in parallel into the shift register. Following this transfer, signals are applied to return the photosensors to their charge-accumulating condition, and while said photosensitive elements are again being charged, the charge packets previously dumped into the shift register are clocked out to form a sequential video signal. Depending on the format desired for said video signal, the charge packets clocked out of the shift register may be used at the very time they are clocked out or, in the alternative, they may be stored in a buffer shift register or some other memory device, the latter ones of which may be independently clocked by an output multiplexer and an output demultiplexer, so as to permit some other desired video signal format to be achieved. Although the last mentioned format adjusting operation is not considered to be a part of the aforesaid patented image modulator, it ostensibly remains as an option which may be used to an advantage therewith during some operational circumstances. In any event, some image modulation is effected by said image modulator, although, as will be discussed more fully below, it is effected by particular combinations of elements that are different and somewhat more complex than that of the instant invention.

SUMMARY OF THE INVENTION

Although undoubtedly satisfactory for their respective intended purposes, the aforementioned prior art leaves some room for improvement, and insofar as it is known, to a certain extent, the instant invention provides some of that improvement, at least from the structural, functional, and versatility standpoints. For example, it is somewhat less complex structurally, and it has the advantage that it may be designed, regulated, and used to restore near-perfect spatial linearity to optical images being scanned by a photodiode array. Of course, it may be designed, regulated, and used for performing the opposite effect, too, along with many other relatively linear and nonlinear operations, as well.

Very briefly, the present invention incorporates a reference clock generator, the output signal of which triggers an analog sawtooth sweep or ramp function generator and a voltage controlled frequency modulation signal generator, the former of which adjusts the frequency of the latter in accordance with the ramp voltages periodically applied thereto. The latter also drives a signal generator and distributor at the proper rate to timely produce and distribute a transfer gate signal, a predetermined succession of shift register transport signals (the number of which effectively depends on the number of image sensors employed), and a control gate enabling signal. The latter three types of signals are supplied to the particular charge coupled derive employed at any given time, although in this particular instance, they are supplied to a plurality of transfer gates, the stages of a shift register, a normally closed control gate, and an amplifier, respectively. When image sensors or other input transducers are appropriately combined suitably interconnected ones of said transfer gates, shift register, control gate, and amplifier, the resulting arrangement constitutes one type of the aforementioned charge coupled devices (CCD) that may be incorporated in the subject invention. By varying the analog sweep or ramp function slope while maintaining a constant reference clock signal, the frequency modulated (FM) or voltage controlled frequency generator produces output frequency variations which, in turn, effectively produce shift register transport clock variations, so as to compensate for spatial or other distortions within an image being sensed by the image sensors of the aforesaid charge coupled device, or vice versa, as desired. Hence, a unique and exceedingly useful variable time rate scanner for linear, nonlinear, spatial, and resolution mapping of one image plane into another is effected by varying the time scan relationship therebetween.

Therefore, an important object of this invention is to provide an improved image modulator.

Another object of this invention is to provide a time compensating charge coupled device for spatial distortion production or correction.

Still another object of this invention is to provide an improved method and means for reproducing an image or other parameter in accordance with a linear-to-linear relationship, thereby effecting a normal relationship between the produced image or parameter and that from which it was produced.

A further object of this invention is to provide an improved method and means for reproducing an image or other parameter in accordance with a linear-to-nonlinear relationship between the produced image or parameter and that from which it was produced, thereby correcting distortions in the latter.

A further object of this invention is to provide an improved method and means for reproducing an image or parameter in accordance with a nonlinear-to-nonlinear relationship between the produced image or parameter and that from which it was produced, thereby improving the sub-area resolution thereof.

Another object of the invention is to provide an improved method and means for reproducing an image or parameter in accordance with a nonlinear-to-linear relationship between the produced image or parameter and that from which it was produced, thereby correcting distortions in the former.

Another object of this invention is to provide an improved parameter modifier that may be combined with any predetermined compatible input and output transducers, optical or otherwise.

Another object of this invention is to provide an improved time-dependent transducer array-matching system.

Another object of this invention is to provide an improved parameter modifier that may be easily and economically manufactured, used, maintained, and stored, and which has a considerable variety of applications.

Other objects, advantages and novel features of the invention will become apparent from the following detailed description of the invention when considered in conjunction with the accompanying drawing wherein:

BRIEF DESCRIPTION OF THE DRAWING

FIG. 1 is a block diagram of the image modulator system constituting the subject invention; and FIG. 2 is an ideal graphical representation of some of the signals produced at the outputs of several of the block represented elements of FIG. 1.

DESCRIPTION OF THE PREFERRED EMBODIMENT

Referring now to FIG. 1, there is shown an adjustable frequency reference clock signal generator 11, the output of which is connected to the trigger inputs of an adjustable ramp generator 13 and a voltage controlled frequency generator 15. Said ramp generator 13 is, of course, adjustable in such manner as to permit the changing of the slope of the sawtooth output voltage signal therefrom, as desired, and voltage controlled frequency generator 15 conventionally produces a cyclical output signal of any predetermined waveform characteristic — such as, for example, a sinewave, squarewave, clipped squarewave, or the like — the frequency of which varies in proportion with the voltage supplied to the control input thereof. The output of adjustable ramp generator 13 is connected to the control input of voltage control frequency generator 15 for such frequency control purposes, and the output of said voltage control frequency generator 15 is connected to the input of a signal generator and distributor 17. For reasons which will be explained more fully below, signal generator and distributor 17 should be designed to generate, delay as appropriate, and distribute a plurality of output signals in accordance with a predetermined program, say, somewhat similar to those respectively depicted in FIGS. 2(A), (B), and (C). of course, it should be understood that the aforesaid program thereof is intended to be without limitation, inasmuch as it must be properly selected by the artisan in such manner that signal generator 17 will be compatible with all of the other elements of the invention associated therewith and, thus, be operable for any given intended use of the invention. Obviously it would be well within the purview of one skilled in the art having the benefit of the teachings presented herewith to design, program, and incorporate any selected conventional type of generator — distributor for such purpose. On the other hand, the generator — distributor type device shown in FIG. 8 of brochure No. 67023 by the Reticon Corp. of Sunnyvale, California, may optionally be employed as signal generator and distributor 17. Of course, a separate but appropriately interconnected signal generator and programmed electrical signal distributor combination may be substituted therefor, as well, without violating the scope of this invention.

The outputs of the distributor portion of generator-distributor 17 are respectively connected to the inputs of a trio of buffers 19, 21, and 23, each of which may be of any suitable circuit type which isolates one electrical circuit from another, as is conventional in the art. It would perhaps be noteworthy at this time that the plurality of distribution outputs of generator-distributor 17 are preferably supplied to the inputs of a like plurality of buffers, respectively. Buffers 21 are obviously intended to represent said like plurality of buffers, regardless of the number thereof that is required during any given operational circumstance.

The output of buffer 19 is connected to the input (or inputs, as the case may be) of a plurality of transfer gates 25, the number of which is the same as the number of distribution outputs of generator-distributor 17. The inputs of said transfer gates 25 are respectively connected to the outputs of a like plurality of image sensors 27, and the outputs of said transfer gates 25 are respectively connected to the inputs of the data bit storage stages of a digital shift register 29, the shift inputs of which are respectively connected to the distribution outputs of the aforementioned buffers 21.

It would perhaps be noteworthy at this time that, generically speaking, image sensors 27 are one or more transducers which convert light received at the optical inputs thereof into electrical signals proportional thereto. Hence, the optical inputs thereof may effectively observe any predetermined image or scene, whether distorted or not, but herein defined as being a distorted image or scene 31 for reasons which will be discussed more fully subsequently. Nevertheless, said image sensors may be replaced with any compatible transducer which will convert any desired input signals into electrical signals respectively proportional thereto, be said desired input signals electrical or physically or optically sensatory, or the like.

Furthermore, it may be of interest to note that the numbers of transfer gates 25, image sensors 27, and the stages of shift register 29 are identical, with the numbers thereof being those that are required to provide sufficient scanning operations during any given situation. Thus, they may be one or more, as desired, although just seven thereof are depicted in the subject preferred embodiment of the invention illustrated in FIG. 1.

As previously suggested, since image sensors 27 may be any transducers that are appropriate to the operational situation, and for purposes of emphasis, any suitable parameter may be substituted for distorted image or scene 31, as long as it is capable of being used as the input to whatever transducer is substituted for image sensors 27. And because so doing obviously increases the versatility of the invention considerably, it should be readily apparent that it constitutes an improvement over the above mentioned prior art for its intended purposes.

The data output of shift register 29 is connected to the data input of a normally closed control gate 33, the control input of which is connected to the output of the aforesaid buffer 23. The output of gate 33 is connected to the input of an adjustable gain amplifier 35, the output of which is or may be connected to an output terminal 37, which, in turn, may constitute one of the outputs of the invention, if so desired.

The aforementioned combination of transfer gates 25, image sensors 27, digital shift register 29, control gate 33, and amplifier 35, in this particular embodiment of the invention, constitute a charge coupled device (CCD) that is, for instance, one of many which may be incorporated therein to an advantage.

The output of amplifier 35 is also connected to the input of a low-pass filter or integrator 41, the output of which is connected to another output terminal 43 — which, likewise, may be considered as being one of the outputs of the subject invention — and to the input of any suitable readout 45, which, for instance, may be a laser light facsimile recorder or any other video or display apparatus, be it linear or nonlinear.

At this time, it should perhaps be mentioned that each and everyone of the elements represented in block form in the system of FIG. 1 are well known, conventional, and commercially available; therefore, it is to be understood that it is the unique interconnections and interactions that effect the subject invention and cause it to produce the new and highly useful results mentioned above. Moreover, said results are either new and different from or constitute some improvement over all of those produced by the known prior art, in spite of the fact that, in reality, the construction of the invention is somewhat simpler than the devices of said prior art. Accordingly, both structural and functional differences — some of which are highly significant and some of which are quite subtle — between the invention and the devices of the known prior art are deemed to be sufficient to make the former patently distinguish over the latter.

MODE OF OPERATION

The operation of the invention will now be discussed briefly in conjunction with both figures of the drawing.

Reference clock generator 11 should be set so that the frequency thereof is the same as the raster or other operational sweep frequency of readout 41. Accordingly, it puts out a predetermined series of pulses which simultaneously trigger ramp generator 13 to initiate the generation of a sawtooth signal in synchronism with the initiation of the frequency modulated output cyclical signal from voltage controlled frequency generator 15, thereby starting said sawtooth signal and said frequency modulated cyclical signal at the same time at the beginning of each cycle.

As previously indicated, the output signal from voltage controlled frequency signal generator 15 is cyclical in nature, with the frequency thereof increasing proportionally with the voltage supplied to the control input thereof. Furthermore, the waveform thereof may be that selected by the artisan which will be compatible with the input of generator — distributor 17; consequently, it may be a sinewave, a squarewave, a clipped squarewave, or any other appropriate cyclical wave.

At the beginning of each cycle, said cyclical wave signal from voltage control frequency generator 15 triggers the start of the generation and distribution of signals by generator — distributor 17 which, after being buffered by buffers 19, 21, and 27 are similar to those ideally illustrated in FIGS. 2(A), (B), and (C), respectively. Of course, said illustrated signals constitute timing signals which timely and properly enable the aforementioned transfer gates 25, shift shift register 29, open control gate 33, and enable amplifier 35.

Referring now to image or scene 31, regardless of what it is — and distorted or not — the light reflections therefrom or images thereof are continually sensed by array of image sensors 27, and charges representative thereof, thus, accumulate therein. In this particular case, said charges are seven in number; but, obviously, any number thereof could be acquired, depending on the number of image sensors employed. Nevertheless, for the purposes of keeping the disclosure of this case simple, only seven charges are simultaneously stored over any given constant increment of time, the increment of which is effectively controlled by the signal of FIG. 2(A). Hence, when the leading edge of pulse 51 of the signal of FIG. 2(A) occurs, each of transfer gates 25 are opened, and said seven accumulated charges are transferred to the seven memory stages of shift register 29, and when the trailing edge of pulse 51 occurs, transfer gates 25 are closed, thus permitting image sensors 27 to again accumulate charges representing image or scene 31.

As seen in FIG. 2(B), there is a delay period 53 in the signal thereof, at which time the aforementioned charge transfer takes place, after which a succession of shift pulses 55, etc., occur that successively shifts shift register 29, in turn, cause a signal similar to that portrayed in FIG. 3(D) to be serially read out therefrom and be supplied to the input of gate 33 and then on to and through amplifier 35. But to be effective as a result of passing through gate 33, gate 33 must be open at the time that the data stored in shift register 29 — that is, the signal of FIG. 2(D) — is being serially read out therefrom. The opening thereof is effected by successive pulses 57 of the signal of FIG. 2(C), with each pulse thereof coinciding with the shift of each of the seven data bits through and out of shift register 29. Thus, it may readily be seen that gate 33 is closed between data bit readouts by shift register 29, with such closing thereof keeping the noise level as low as possible in the output signal of FIG. 2(D).

As is conventional with amplifiers, the output signal therefrom is or may be amplified to the most useful level in accordance with the design and gain setting thereof; however, in this particular case, the output signal characteristics remain substantially the same as shown in FIG. 2(D).

As also may be observed in FIG. 2(D), gate 33 is open and amplifier 35 is enabled only at those times when pulses 57 occur in the signal of FIG. 2(C); therefore, only video data of significance — herein represented by varying pulses 61, 63, 65, 67, 69, 71, and 73 — may timely pass therethrough, and, at all other times, only inconsequential and negligible signals 75 may occur in the form of a low amplitude hum, spurious stray signals, or the like, due to the internal workings of the circuits of the aforesaid gate and amplifier elements.

As previously suggested, output terminal 37, which is connected to the output amplifier 35, may be considered as one of the outputs of the invention. However, it has been determined that the output signal that occurs thereat — that is, the signal of FIG. 2(D) — is improved in most instances by passing it through low-pass filter or integrator 41, inasmuch as shifting pulses are eliminated and waveform edges are smoothed thereby; hence, if so desired, another output of the invention may be considered to be at terminal 43, as, likewise, previously suggested.

When read out by any appropriate type of readout, recorder, or video display (or, as in this particular embodiment, by a laser light facsimile recorder), th signal of FIG. 2(D) produces an image which is a modified version of the image of scene 31, be it distorted or not. Suitable adjustments of reference clock generator 11 make the invention synchronized with — and, thus, compatible with — readout 45, regardless of the type selected. And adjustments of the amplitude of the sawtooth signal produced by ramp generator 13 cause whatever relative linear or nonlinear relationships as are desired with respect to scene 31 and the image produced by readout 45, and vice versa. Of course, depending on the sensor and readout selected, said relationships may be varied in whatever manner is warranted by operational circumstances. Thus, they may be varied as optical images, as analog or other signals, or as parameters. However, in this particular disclosed embodiment, the invention performs such new and unique functions as will provide time compensating image scanning for spatial distortion correction purposes. Consequently, it becomes possible to restore near-perfect linearity to images scanned by photo charge coupled devices and the like, and with proper adjustments thereof made by the artisan, may do just the opposite, as well.

From the foregoing, it should be readily apparent that the techniques, methods, and means for modulating images and other parameters provided by the subject invention do, indeed, constitute a worthwhile advance in the art.

Obviously, many modifications and variations of the present invention are possible in light of the above teachings. It is, therefore, to be understood that within the scope of the appended claims the invention may be practiced otherwise than as specifically described.

CLAIMS

What is claimed is:

1. A parameter modifier, comprising in combination:
   means for sensing the aforesaid parameter to be modified and for producing a first signal proportional thereto;
   means for timely storing and reading out said first signal in effective response to second and third signals, respectively;
   means connected between the output of said parameter sensing means and the input of the aforesaid first signal storing and reading out means for transferring said first signal from said parameter sensing means to said storing and reading out means for the timely storage thereof therein in response to said second signal;
   means effectively connected to the inputs of said first signal transferring means and said storage and readout means for generating said second and third signals and distributing them thereto, respectively, with said second signal being supplied to said first signal transferring means a predetermined time prior to the time said third signal is supplied to said storing and readout means.

2. The device of claim 1, wherein said parameter comprises an optical image.

3. The device of claim 1, wherein said means for sensing the aforesaid parameter to be modified and for producing a first signal proportional thereto comprises a predetermined transducer.

4. The device of claim 1, wherein said means for sensing the aforesaid parameter to be modified and for producing a first signal proportional thereto comprises an electro-optical transducer, and the parameter being sensed thereby is an optical image.

5. The device of claim 1, wherein said means for timely storing and reading out said first signal in effective response to second and third signals, respectively, comprises a shift register.

6. The device of claim 1, wherein said means connected between the output of said parameter sensing means and the input of the aforesaid first signal storing and reading out means for transferring said first signal from said parameter sensing means to said storing and reading out means for the timely storage thereof therein in response to said second signal comprises a transfer gate.

7. The device of claim 1, wherein said means effectively connected to the inputs of said first signal transferring means and said storage and readout means for generating said second and third signals and distributing them thereto, respectively, with said second signal being supplied to said first signal transferring means a predetermined time prior to the time said third signal is supplied to said storing and readout means comprises a signal generator and distributor.

8. The device of claim 1, wherein said means effectively connected to the inputs of said first signal transferring means and said storage and readout means for generating said second and third signals and distributing them thereto, respectively, with said second signal being supplied to said first signal transferring means a predetermined time prior to the time said third signal is supplied to said storing and readout means comprises:
   means for generating a predetermined number of electrical signals; and
   means connected to the outputs of said electrical signals generating means for the distributing of the signals generated thereby in accordance with predetermined waveform and timing programs, respectively.

9. The device in claim 1, wherein said means effectively connected to the inputs of said first signal transferring means and said storage and readout means for generating said second and third signals and distributing them thereto, respectively, with said second signal being supplied to said first signal transferring means a predetermined time prior to the time said third signal is supplied to said storing and readout means comprises:
   means for generating a trio of electrical signals in response to a fifth signal;
   an adjustable frequency reference clock generator;
   an adjustable ramp generator connected to the output of said adjustable frequency reference clock generator;
   a voltage controlled frequency generator having a trigger input, a control input, and an output, with the trigger input thereof connected to the output of the aforesaid adjustable frequency reference clock generator, with the control input thereof connected to the output of said adjustable ramp generator, and with the output thereof connected to the input of the aforesaid electrical signals generating means for timely supplying said fifth signal thereto; and means connected to the outputs of said electrical signals generating means for the distributing of the trio of electrical signals generated thereby in accordance with predetermined waveform and timing programs, respectively.

10. The invention of claim 9, further characterized by control gate means having a data input, a control input, and an output, with the data input thereof connected to the output of the aforesaid storing and readout means, and with the control input thereof connected to one of the outputs of said distributing means.

11. The invention of claim 9, further characterized by:
 a gate having a data input, a control input, and an output, with the data input thereof connected to the output of the aforesaid storing and reading out means, and with the control input thereof effectively connected to one of the outputs of said distributing means; and
 an amplifier having a data input, an enabling input, and an output, with the data input thereof connected to the output of said gate, and with the enabling input thereof effectively connected to one of the outputs of the aforesaid distributing means.

12. An image modifier, comprising in combination:
 means for generating a predetermined clock signal;
 adjustable means connected to the output of said clock signal generating means for producing a predetermined sawtooth signal in response to the predetermined clock signal generated thereby;
 means for producing a predetermined frequency signal, the frequency of which is varied with a sawtooth voltage supplied thereto, said producing means having a trigger input connected to the output of said clock signal generating means for response to the predetermined clock signal produced thereby, a control input connected to the output of said sawtooth signal producing means for response to the predetermined sawtooth signal produced thereby, and an output;
 means connected to the output of said predetermined frequency producing means for generating and distributing a plurality of signals, each of which is timed and shaped in accordance with a particular program;
 means connected to the outputs of the distributor portion of said generating and distributing means for sensing a predetermined image and for producing a signal at the output thereof that represents a certain modified version thereof in response to the aforesaid plurality of signals generated thereby and the adjustment of said sawtooth signal producing means.

13. The invention of claim 12, wherein said means for generating a predetermined clock signal comprises an adjustable frequency reference clock signal generator.

14. The invention of claim 12, wherein said adjustable means connected to the output of said clock signal generating means for producing a predetermined sawtooth signal in response to the predetermined clock signal generated thereby comprises an adjustable ramp generator.

15. The invention of claim 12, wherein said means for producing a predetermined frequency signal, the frequency of which is varied with a sawtooth voltage supplied thereto, comprises a voltage controlled frequency generator.

16. The invention of claim 12, wherein said means connected to the output of said predetermined frequency producing means for generating and distributing a plurality of signals, each of which is timed and shaped in accordance with a particular program comprises:
 a programmed electrical signal generator for generating said plurality of signals; and
 an electrical signal distributor connected to the outputs of said programmed electrical signal generator for distributing the programmed signals produced thereby.

17. The invention of claim 12, wherein said means connected to the outputs of the distributor portion of said generating and distributing means for sensing a predetermined image and for producing a signal at the output thereof that represents a certain modified version thereof in response to the aforesaid plurality of signals generated thereby and the adjustment of said sawtooth signal producing means comprises a charge coupled device.

18. The invention of claim 12, further characterized by a low-pass filter connected to the output of the aforesaid predetermined image sensing and signal producing means for filtering the signal therefrom that represents a certain modified version of said image in a predetermined manner.

19. The invention of claim 12, further characterized by a plurality of buffers respectively connected to the distributor outputs of the aforesaid plurality of signals generating and distributing means.

20. A parameter modifier, comprising in combination:
 a reference clock signal generator;
 an adjustable ramp generator connected to the output of said reference clock signal generator;
 a voltage control frequency generator having a data input, a control input, and an output, with the data input thereof connected to the output of said adjustable reference clock signal generator, and with the control input thereof connected to the output of said adjustable ramp generator;
 a signal generator and distributor having an input and a plurality of outputs, with the input thereof connected to the output of said voltage control frequency generator;
 a plurality of sensors for sensing the aforesaid parameter to be modified;
 a like plurality of transfer gates having a transfer input and a plurality of inputs respectively connected to the outputs of the aforesaid plurality of sensors, and a plurality of outputs;
 a shift register having a like plurality of stages with inputs thereto, a like plurality of shift inputs, and an output, with the plurality of stage inputs thereof respectively connected to the outputs of the aforesaid plurality of transfer gates, and with the shift inputs thereof respectively connected to a like plurality of outputs of the aforesaid signal generator and distributor; and
 a control gate having a data input, a control input, and an output, with the data input thereof connected to the output of said shift register, and with the control input thereof effectively connected to another of the outputs of the aforesaid signal generator and distributor.

21. The invention of claim 20, further characterized by an adjustable gain enabling amplifier having a data input, a control input, and an output, with the data input thereof connected to the output of said control gate, and with the control input thereof effectively connected to said another of the outputs of the aforesaid signal generator and distributor.

22. The invention of claim 21, further characterized by a low-pass filter connected to the output of said adjustable gain enabling amplifier.

23. The invention of claim 21, further characterized by an integrator connected to the output of said adjustable gain enabling amplifier.

24. The invention of claim 21, further characterized by:
a low-pass filter connected to the output of said adjustable gain enabling amplifier; and
a readout connected to the output of said low-pass filter.

25. The invention of claim 21, further characterized by:
an integrator connected to the output of said adjustable gain enabling amplifier; and
a readout connected to the output of said integrator.

26. The invention of claim 21, further characterized by:
a low-pass filter connected to the output of said adjustable gain enabling amplifier; and
a laser light facsimile recorder connected to the output of said low-pass filter.

27. The invention of claim 21, further characterized by:
an integrator; and
a laser light facsimile recorder connected to the output of said integrator.

28. The invention of claim 21, further characterized by a readout effectively connected to the output of the aforesaid adjustable gain enabling amplifier.

29. The invention of claim 21, further characterized by a laser light facsimile recorder effectively connected to the output of said adjustable gain enabling amplifier.

30. The invention of claim 21, wherein said plurality of parameter sensors comprises a like plurality of image sensors, and the image sensed thereby is a predetermined optical image.

31. The invention of claim 21, further characterized by a plurality of buffers connected between the outputs of the aforesaid signal generator and distributor and the transfer inputs of the aforesaid transfer gates, the shift inputs of the aforesaid shift register, and the control inputs of said control gate and enabling amplifier, respectively.

* * * * *